United States Patent [19]

Sputhe

[11] Patent Number: 6,076,416
[45] Date of Patent: Jun. 20, 2000

[54] REVERSE GEAR TRANSMISSION

[76] Inventor: Alan C. Sputhe, 11185 Lime Kiln Rd., Grass Valley, Calif. 95949

[21] Appl. No.: 09/250,678

[22] Filed: Feb. 16, 1999

Related U.S. Application Data

[60] Provisional application No. 60/075,604, Feb. 18, 1998.

[51] Int. Cl.[7] .............................. F16H 3/16; F16H 63/36
[52] U.S. Cl. ...................... 74/342; 74/473.21; 74/473.22; 74/473.24
[58] Field of Search ................................ 74/342, 473.21, 74/473.23, 473.24, 473.22

[56] References Cited

U.S. PATENT DOCUMENTS

| | | | |
|---|---|---|---|
| 2,920,504 | 1/1960 | Sömmer | 74/473.21 |
| 3,347,108 | 10/1967 | Hinke | 74/342 |
| 3,365,972 | 1/1968 | Luke et al. | 74/342 |
| 4,337,675 | 7/1982 | Holdeman | 74/473.24 |
| 5,046,596 | 9/1991 | Dennert | |
| 5,186,070 | 2/1993 | Nitzschke et al. | 74/473.24 |

*Primary Examiner*—Sherry L. Estremsky
*Attorney, Agent, or Firm*—David Weiss

[57] ABSTRACT

A motorcycle reverse gear transmission that precludes inadvertent shifting into a forward gear when in reverse and inadvertent shifting into reverse when in a forward gear. The reverse gear transmission requires the forward ratio gears to be in neutral before shifting into reverse; during shifting, the apparatus locks the forward gears in neutral and then engages the reverse gear. The forward ratio gears are unlocked from neutral after the reverse gear is disengaged.

3 Claims, 3 Drawing Sheets

REVERSE GEAR TRANSMISSION

CROSS REFERENCE TO RELATED APPLICATION

This application claims the benefit of U.S. Provisional Application No. 60/075,604, filed Feb. 18, 1998, and the disclosure of said provisional application is incorporated herein by reference.

FIELD OF THE INVENTION

This application relates to transmissions for a motorcycle or motor tricycle, and more particularly to a reverse gear transmission that precludes inadvertent shifting into a forward gear when in reverse and inadvertent shifting into reverse gear when in a forward gear.

BACKGROUND OF THE INVENTION

Conventional motorcycles and motor tricycles have transmissions that include a plurality of forward ratio gears, typically four or five, and a reverse gear capability is generally not included in such transmissions. A foot responsive gear shifter is conventionally used for sequentially engaging the forward gears. A reverse capability is of particular convenience for motorcycles with a sidecar and for motor tricycles, where it is difficult to back up the vehicle with the operator's feet applying traction to the road surface or otherwise physically moving the cycle backwardly. Normally, in such vehicles not having a reverse gear capability, the operator may shift the transmission gears into neutral and reverse the starter motor to backwardly move the cycle. Previous attempts to incorporate a reverse gear capability in a motorcycle transmission have not met with popular success. A conventional motorcycle forward gear transmission generally employs two parallel shafts (specifically a mainshaft and a countershaft) carrying the forward ratio gears, and in the past a reverse capability had been provided by adding a third or reverse shaft carrying a reverse gear arrangement and employed a hand shifter operating in a gate to engage both the forward ratio gears and the reverse gear. Such prior art reverse gear transmissions did not preclude inadvertent shifting into a forward gear when in reverse and the inadvertent shifting into reverse when in a forward gear.

SUMMARY OF THE INVENTION

As used herein, the term "motorcycle" includes a two-wheel motorcycle whether or not accompanied by another platform such as a sidecar, as well as a motor tricycle.

By the present invention, a motorcycle reverse gear transmission is provided that avoids the limitations and disadvantages of prior art motorcycle reverse gear transmissions, and in particular precludes inadvertent shifting into a forward gear when in reverse and inadvertent shifting into reverse when in a forward gear. The reverse gear transmission of the present invention requires the forward ratio gears to be in neutral before shifting into reverse; during shifting, the apparatus locks the forward gears in neutral mode and then engages the reverse gear. The apparatus unlocks the forward ratio gears from neutral after disengaging the reverse gear. The reverse gear mechanism is activated by a shifter shaft separate from the shifter shaft utilized for initiating forward ratio gear shifts, and the locking out of the forward ratio gears prevents forward ratio gear engagement through attempted operation of the forward shifter. Similarly, when a forward ratio gear is engaged by application of the forward shifter, a reverse engagement upon attempted operation of the reverse shifter is prevented since the transmission is not in neutral mode.

In a motorcycle transmission having a mainshaft, a countershaft and a forward gear shifter, the mainshaft carrying a plurality of forward ratio gears including a first gear and an output gear, and the countershaft having a plurality of forward ratio gears including a first gear, the reverse gear apparatus of the present invention comprises in combination: a reverse shaft having a longitudinal axis and supported for rotation about and for translation along such axis; a reverse input gear carried by the reverse shaft and engageable with the first forward gear carried by the countershaft; a reverse output gear carried by the reverse shaft and engageable with the output gear carried by the mainshaft; and a reverse gear shifter for locking the forward gears in neutral after having been shifted into neutral by the forward gear shifter, and for axially moving the reverse shaft such that the reverse input gear engages the countershaft first gear and the reverse output gear engages the mainshaft output gear.

The reverse gear shifter, in a preferred embodiment, includes: a shift lever pivotable about a fixed pivot axis; a reverse shifter shaft coupled to the shift lever for pivoting the shift lever when the shifter shaft is rotated; a neutral lock pin coupled to the shifter lever and engageable with the transmission for locking the forward gears in neutral when the shifter shaft is rotated in a first direction; and a reverse shift fork coupled to the shift lever and engageable with the reverse shaft upon further rotation of the shifter shaft in the first direction, for moving the reverse shaft to engage the reverse input gear with the countershaft first gear and to engage the reverse output gear with the mainshaft output gear. Upon rotation of the reverse shifter shaft in a second direction opposite the first direction, the reverse shift fork moves the reverse shaft for disengaging the reverse input gear from the countershaft first gear and the reverse output gear from the mainshaft output gear; and upon further rotation of the reverse shifter shaft in the second direction, the neutral lock pin disengages from the transmission for unlocking the forward gears.

The shift lever of the reverse gear shifter further includes: a first link having a first end pivotally coupled to the shift lever and having a second end, and a second link having a first end pivotally coupled to the shift lever and having a second end, the fixed pivot axis of the shift lever and the pivot axes of the first ends of the links being spaced to describe a triangle; the neutral lock pin supported for axial movement and having one end pivotally coupled to the second end of the first link; a fork guide pin carrying the shift fork and supported for axial movement; and a shift arm pivotable about a fixed pivot axis and having a first end pivotally coupled to the second end of the second link, the shift arm having a second end coupled to the fork guide pin for axially moving the fork guide pin when the arm is pivoted about its fixed axis.

BRIEF DESCRIPTION OF THE DRAWINGS

The novel features which are believed to be characteristic of the invention, together with further advantages thereof, will be better understood from the following description considered in connection with the accompanying drawings in which a preferred embodiment is illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
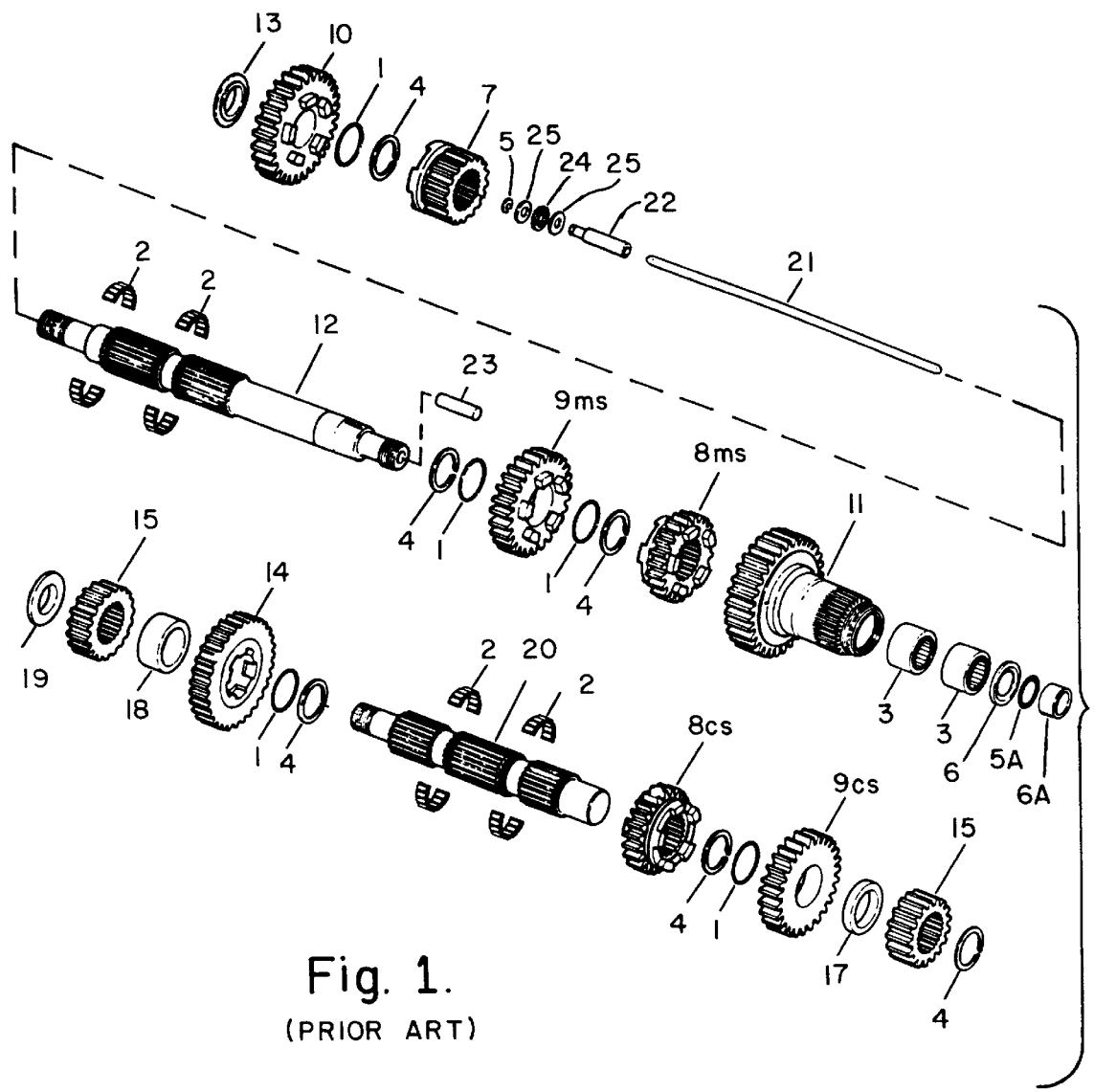
FIG. 1 is an exploded perspective view of a gear assembly of a conventional five forward speed transmission for a motorcycle, specifically a Harley-Davidson motorcycle.

A typical motorcycle transmission gear assembly that does not include a reverse capability is exemplified by the five forward ratio (or five speed) transmission gear assembly of FIG. 1, which transmission gear assembly is for a Harley-Davidson motorcycle. The reference numerals 1–25 contained in FIG. 1 correspond to transmission gear parts identified in the following Table 1, including part numbers and names, as marketed by Harley-Davidson.

TABLE 1

| Reference No. | PART NO. | NAME |
|---|---|---|
| 1 | 6003 | THRUST WASHER (5) |
| 2 | 8876 | BEARING (4) |
| 3 | 8904 | NEEDLE BEARING, mainshaft fifth gear (2) |
| 4 | 11067 | RETAINING RING (6) |
| 5 | 11096 | RETAINING RING |
| 5A | 11162 | O-RING, mainshaft - right end |
| 6 | 12013A | OIL SEAL, mainshaft fifth gear |
| 6A | 34091-85 | BEARING, inner race |
| 7 | 35025-79 | FIRST GEAR, mainshaft |
| 8 | 35026-79A | GEAR, mainshaft second & countershaft third (2) |
| 9 | 35027-79A | GEAR, mainshaft third & countershaft second (2) |
| 10 | 35028-79 | FOURTH GEAR, mainshaft |
| 11 | 35029-79 | FIFTH GEAR, mainshaft |
|  | 35029-84 | FIFTH GEAR, mainshaft |
|  | 35029-85 | FIFTH GEAR, mainshaft |
| 12 | 35042-79 | MAINSHAFT |
|  | 35042-84 | MAINSHAFT |
|  | 35042-85 | MAINSHAFT |
| 13 | 35064-79 | SPACER, mainshaft |
| 14 | 35622-79A | FIRST GEAR, countershaft |
| 15 | 35625-79 | FOURTH GEAR, countershaft |
| 16 | 35626-79 | FIFTH GEAR, countershaft |
| 17 | 35627-79 | SPACER |
| 18 | 35628-79 | SPACER |
| 19 | 35629-79 | SPACER |
| 20 | 35632-79 | COUNTERSHAFT |
| 21 | 37088-79 | PUSH ROD, clutch release (thru mainshaft) |
|  | 37088-84 | PUSH ROD, clutch release (thru mainshaft) |
|  | 37088-85 | PUSH ROD, clutch release |
| 22 | 37089-79 | END, push rod - right side |
|  | 37089-84 | ROD END, clutch push rod - right |
| 23 | 37090-79 | END, push rod - left side |
|  | 37090-84 | ROD END, clutch push rod - left |
| 24 | 37312-75 | BEARING |
| 25 | 37313-80 | THRUST WASHER (2) |

A conventional forward gear motorcycle transmission further includes gear shifter apparatus including a foot-operated shifter that sequentially engages the forward gears. A conventional forward ratio gear shifter apparatus is shown in pending U.S. patent application Ser. No. 09/246,254, entitled "Positive-Stop Gear Shifter", filed by Alan C. Sputhe on Feb. 8, 1999 [filed further to and claiming the benefit of U.S. Provisional Application No. 60/074,417 filed Feb. 11, 1998], which pending application is incorporated herein by reference. FIG. 1 of the incorporated patent application, along with the text therein corresponding thereto, shows and describes a conventional forward gear shifter apparatus for a Harley-Davidson motorcycle transmission, and is operationally compatible with the forward ratio gear assembly shown in FIG. 1 of the present application. Motorcycle forward transmission gear assemblies and gear shifter apparatus, and their operation, are well known to persons of ordinary skill in the relevant art.

Figure 2:
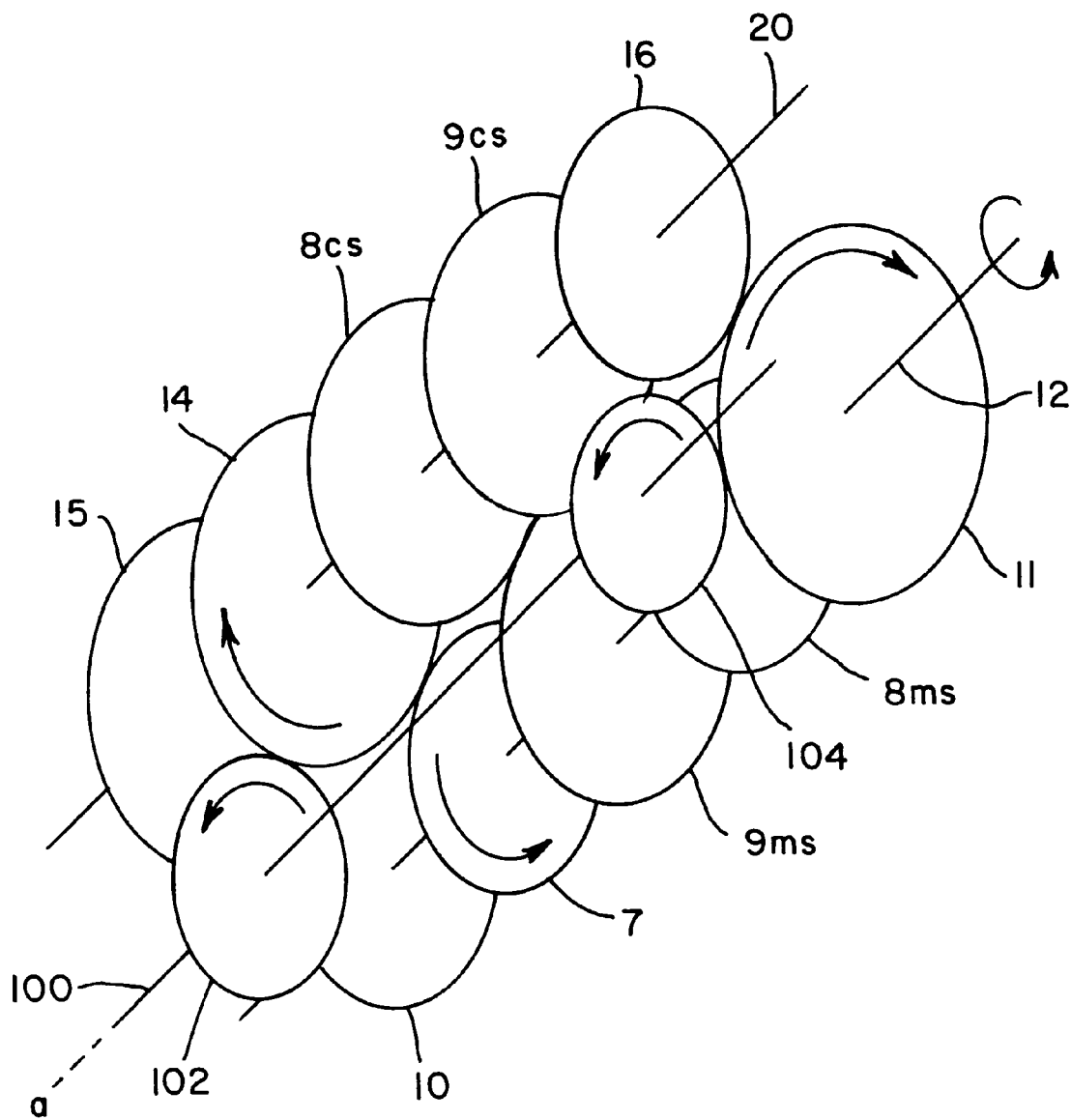
FIG. 2 is a schematic representation of the transmission gear assembly shown in FIG. 1 in operative combination with a preferred embodiment of the reverse gear transmission apparatus according to the present invention.

In addition to a mainshaft 12 and a countershaft 20 each carrying five forward ratio gears as represented in both FIGS. 1 and 2, the transmission gear assembly according to the present invention and represented in FIG. 2 includes a third or reverse shaft 100 that carries a reverse input gear 102 and a reverse output gear 104. Like the mainshaft 12 and countershaft 20, the reverse shaft 100 is supported in conventional manner within the transmission housing, with its longitudinal axis a parallel to the longitudinal axis of the mainshaft 12 and the countershaft 20. The reverse shaft 100 is rotatable about its longitudinal axis a and is displaceable or translationally moveable along its longitudinal axis a.

In effecting a reverse shift, the transmission is first locked into neutral mode (i.e. the transmission is shifted into neutral and the forward ratio gears are locked out), and the reverse shaft 100 is then positioned such that the reverse input gear 102 is in driven engagement with the countershaft first gear 14 and reverse output gear 104 is in driving engagement with the mainshaft output (or fifth) gear 11. When input power is applied for rotationally driving the mainshaft 12 (e.g. in the counterclockwise direction as viewed in FIG. 2), the rotationally driven mainshaft 12 causes the mainshaft first gear 7 to rotate, which in turn rotationally drives the countershaft first gear 14 in the clockwise direction. The countershaft first gear 14 in turn rotationally drives the reverse input gear 102 (counterclockwise) which in turn drives the reverse output gear 104 through the reverse shaft 100. The reverse output gear 104 rotationally drives the mainshaft output gear 11 (clockwise). The mainshaft output gear 11 is coaxial with the mainshaft 12, and the mainshaft output gear 11 rotates in a direction opposite to that of the mainshaft 12, resulting in a reverse output.

Figure 3A:
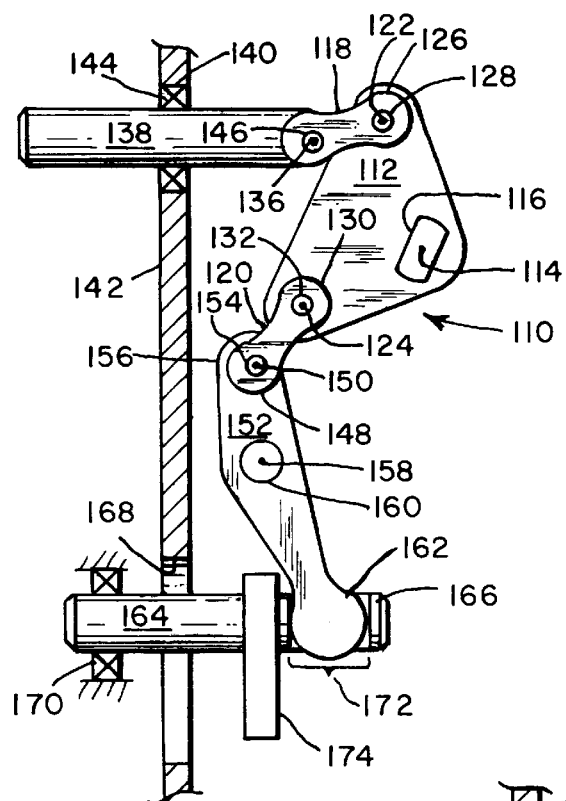
FIG. 3A is a side elevation view of a preferred embodiment of a reverse gear shifter mechanism according to the present invention, in its fully disengaged condition.
Figure 3B:
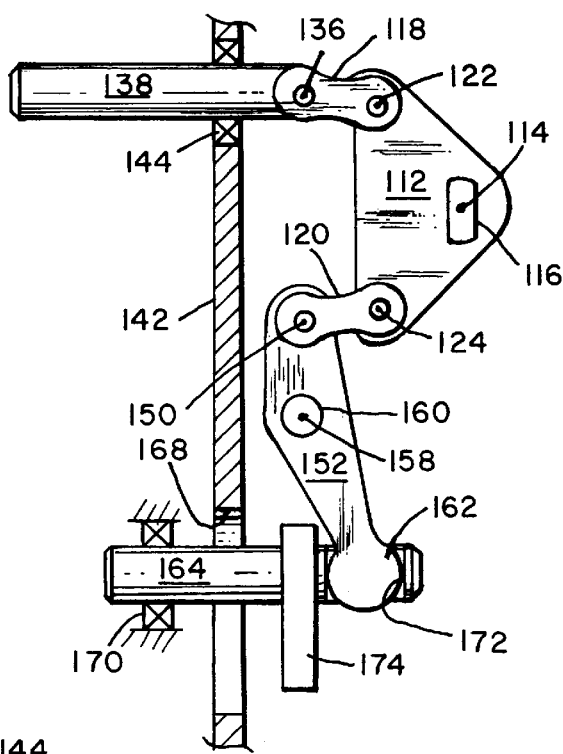
FIG. 3B is the shifter of FIG. 3A, in its partially engaged condition.
Figure 3C:
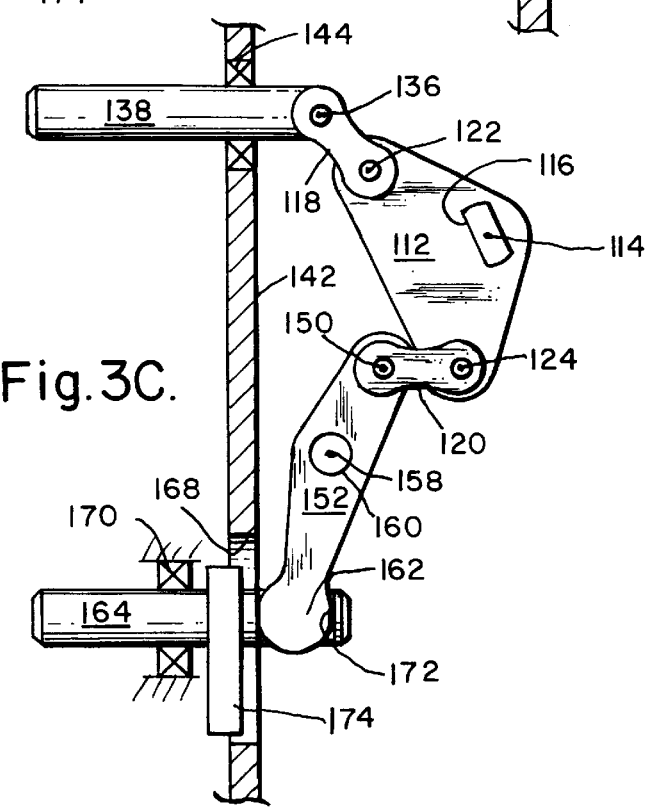
FIG. 3C is the shifter of FIG. 3A, in its fully engaged condition.

Turning to FIGS. 3A, 3B and 3C, the preferred embodiment of the reverse shifter mechanism 110 includes a shift lever 112 that is pivotable about a stationary or fixed pivot axis 114 (perpendicular to the plane of the drawing as viewed in FIG. 3) through rotation of a reverse shifter shaft 116. The lever 112 may be a generally triangular-shaped plate, with the fixed pivot axis 114 at one of the corners and with links 118, 120 pivotally attached to the lever 112 about respective pivot axes 122, 124 at the two opposite corners. As shown in FIG. 3A, a first end 126 of the first link 118 is pivotally attached by pivot pin 128 secured to the shift lever plate 112, and a first end 130 of the second link 120 is pivotally attached by pivot pin 132 secured to the shift lever plate 112.

The second end 134 of the first link 118 is pivotally attached (about pivot axis 136) to a neutral lock pin 138 extending through a bore 140 in the transmission housing access cover 142, the neutral lock pin 138 being supported for axial movement such as by bushing 144. The first link's second end 134 is pivotally attached by a pivot pin 146 secured to the neutral lock pin 138 near one of its ends.

The second end 148 of the second link 120 is pivotally attached (at pivot axis 150) to a reverse shift arm 152, by means of a pivot pin 154 secured to the shift arm 152 near its upper end 156 (as viewed in the drawing of FIG. 3A). The reverse shift arm 152 is pivotable about a stationary or fixed pivot axis 158 of a pivot pin 160 secured to the reverse shift mechanism housing, and the other or lower end 162 of the shift arm 152 is coupled to a guide pin 164 near one of its ends extending through a bore 168 in the transmission housing access cover 142 and supported for axial movement such as by means of a bushing 170 secured to the transmission housing. The lower end 162 of the shift arm 152 is coupled to the guide pin in such manner as to axially move the supported guide pin 164 to the left (as viewed in the drawing of FIG. 3A), for example through a cam/cam follower arrangement where the shift arm's lower end 162 has a curved or cylindrical surface engaging a channel 172 near the guide pin's end 166 for moving the pin 164 to the left or right when the shift arm 152 is pivoted clockwise or counterclockwise, respectively. A reverse shift fork 174 is carried by the guide pin 164, for being guided by the guide pin 164 through the bore 168 into engagement with the reverse shaft 100 for moving the reverse shaft 100 along its longitudinal axis for engagement and disengagement of the reverse gears 102, 104 with the countershaft first gear 14 and the mainshaft output gear 11.

FIG. 3A shows the reverse shift mechanism 110 in its fully disengaged condition, i.e. with the reverse shifter shaft 116 in its full clockwise position and the neutral lock pin 138 and the fork guide pin 164 in the full right (as viewed in the drawing) disengaged positions.

In operation, the forward gear ratio transmission is first shifted into neutral by conventional operation of the forward gear shifter. As shown in FIG. 3B, the reverse shift lever 112 is then pivoted counterclockwise (as viewed in the drawing) in response to counterclockwise rotation of the reverse shifter shaft 116 through a first predetermined rotational displacement. This causes the upper corner of the lever 112 to move to the left, causing the link 118 to pivot about pivot axes 122, 136 and in turn the neutral lock pin 138 to move fully to the left where it is received by a detent in the transmission cam drum and thereby locking the cam drum against rotation and the transmission gears in neutral. Such pivoting of the reverse shift lever 112 causes its lower corner to move to the right, causing the link 120 to pivot about the pivot axes 124, 150, but such movement is insufficient to cause significant pivoting of the shift arm 152 about its pivot axis.

Further counterclockwise pivoting of the reverse shift lever 112 as shown in FIG. 3C, in response to further counterclockwise rotation of the reverse shifter shaft 116 about pivot axis 114 through a second predetermined rotational displacement, does not result in further movement of the neutral lock pin 138 but causes clockwise pivoting of the shift arm 152 about its pivot axis 158, causing its lower end 162 to cause the fork guide pin 164 to move to the left (as viewed in the drawing). Movement of the guide pin 164 to the left causes the attached reverse shift fork 174 to axially displace the reverse shaft 100 for respective engagement of the reverse gears 102, 104 with the countershaft first gear 14 and the mainshaft output gear 11.

When shifting out of reverse, the operator causes the reverse shifter shaft 116 to rotate clockwise into its position shown in FIG. 3A. As the reverse shifter shaft 116 rotates through the second predetermined rotational displacement to assume the position shown in FIG. 3B, the reverse shift fork 174 moves to the right (as viewed in the drawing) and disengages the reverse shaft 100 from its reverse engagement. The neutral lock pin 138 is withdrawn from its cam drum detent when the reverse shifter shaft 116 is further rotated clockwise through the first predetermined rotational displacement to reach the position shown in FIG. 3A.

Rotational operation of the reverse shifter shaft 116 may be implemented by various devices. As examples, the shaft 116 may be solenoid operated, or an operator accessible shifter lever may be coupled to the shaft 116; such shifter lever may be foot operated, hand operated, or thumb operated, and is separate from the operator accessible shifter lever for operating the forward ratio gears.

In one manner of implementing a thumb operable or actuable reverse shifter lever, a spool is attached to the reverse shifter shaft 116. Two cables are attached to this spool and wound in opposite directions, and thumb operated levers may be mounted on the handlebars. Pushing one thumb lever causes the reverse shifter shaft 116 to rotate counterclockwise through the first and second predetermined displacements for engaging reverse, and pushing the other lever causes the reverse shifter shaft 116 to rotate in the clockwise direction through the second and first predetermined displacements for disengaging reverse. Thumb levers may be arranged so that one may be operated by one thumb and the other by the other thumb, or the levers may be arranged (e.g. by being placed one above the other) so that one thumb may operate both levers. Such levers may be arranged such that they pivot on an extension of the clutch and/or brake lever pivot shafts.

In similar manner, thumb levers may be utilized for operating the forward ratio gear shifter shaft as well, i.e. for engaging the forward ratio gears. One lever may sequentially perform uplifts, while the other may perform downshifts.

Thus there has been described reverse gear apparatus for a motorcycle transmission. Other embodiments of the invention and variations of the embodiment presented herein may be developed without departing from the essential characteristics thereof. Accordingly the invention should be limited only by the scope of the claims listed below.

I claim:

1. In a motorcycle transmission having a mainshaft, a countershaft and a forward gear shifter, the mainshaft carrying a plurality of forward ratio gears including a first gear and an output gear, the countershaft carrying a plurality of forward ratio gears including a first gear, a reverse gear apparatus comprising in combination:

a reverse shaft having a longitudinal axis and supported for rotation about and for translation along said axis;

a reverse input gear carried by said reverse shaft and engagable with the first forward gear carried by the countershaft;

a reverse output gear carried by said reverse shaft and engagable with the output gear carried by the mainshaft; and a reverse gear shifter for locking the forward gears in neutral after having been shifted into neutral by the forward gear shifter, and for axially moving said reverse shaft such that said reverse input gear engages the countershaft first gear and said reverse output gear engages the mainshaft output gear, said reverse gear shifter including a shift lever pivotable about a fixed pivot axis, a reverse shifter shaft coupled to said shift lever for pivoting said shift lever when said reverse shifter shaft is rotated, a neutral lock pin coupled to said shift lever and engagable with the transmission for locking the forward gears in neutral when said shifter shaft is rotated in a first direction, and a reverse shift fork coupled to said shift lever and engagable with said reverse shaft upon further rotation of said shifter shaft in said first direction for moving said reverse shaft to engage said reverse input gear with the countershaft first gear and to engage said reverse output gear with the mainshaft output gear.

2. The apparatus according to claim 1, wherein:

said reverse shift fork moves said reverse shaft for disengaging said reverse input gear from the countershaft first gear and said reverse output gear from the mainshaft output gear upon rotation of said reverse shifter shaft in a second direction opposite said first direction; and said neutral lock pin disengages from the transmission for unlocking the forward gears upon further rotation of said reverse shifter shaft in said second direction.

3. The apparatus according to claim 2, further including:

a first link having a first end pivotally coupled to said shift lever and having a second end, and a second link having a first end pivotally coupled said shift lever and having a second end, said fixed pivot axis of said shift lever and the pivot axes of said first ends of said links being spaced to describe a triangle;

said neutral pin supported for axial movement and having one end pivotally coupled to said second end of said first link;

a fork guide pin carrying said shift fork and supported for axial movement; and a shift arm pivotable about a fixed pivot axis and having a first end pivotally coupled to said second end of said second link, said shift arm having a second end coupled to said fork guide pin for axially moving said fork guide pin when said arm is pivoted about its fixed axis.

* * * * *